United States Patent [19]

Yamabe et al.

[11] Patent Number: 4,923,042
[45] Date of Patent: May 8, 1990

[54] FUEL SUPPLY CONTROL METHOD FOR AN ENGINE WITH A FLUID TORQUE CONVERTER CLUTCH

[75] Inventors: Hitoshi Yamabe; Noboru Sekine; Shuichi Takagi; Sachito Fujimoto, all of Saitama, Japan

[73] Assignee: Honda Giken Kogyo Kabushiki Kaisha, Tokyo, Japan

[21] Appl. No.: 339,855

[22] Filed: Apr. 14, 1989

Related U.S. Application Data

[63] Continuation of Ser. No. 39,009, Apr. 15, 1987, abandoned.

[30] Foreign Application Priority Data

Apr. 15, 1986 [JP] Japan .................................. 61-85013

[51] Int. Cl.$^5$ ....................... B60K 41/02; F16H 45/02
[52] U.S. Cl. ................... 192/0.096; 123/325; 192/3.31
[58] Field of Search ............... 192/0.033, 0.084, 0.094, 192/0.096, 3.31; 123/325, 326

[56] References Cited

U.S. PATENT DOCUMENTS

| 3,590,792 | 7/1971 | Masaki et al. | 123/97 |
| 4,036,340 | 7/1977 | Hufendick | 192/0.084 |
| 4,142,488 | 3/1979 | Steinecke et al. | 192/0.033 X |
| 4,192,279 | 3/1980 | Maisch et al. | 123/325 X |
| 4,416,231 | 11/1983 | Lai | 123/327 |
| 4,422,353 | 12/1983 | Suga et al. | 74/858 |
| 4,473,882 | 9/1984 | Suzuki et al. | 192/3.31 X |
| 4,484,497 | 11/1984 | Hibino | 123/325 X |
| 4,585,101 | 4/1986 | Danno | 192/3.31 |

FOREIGN PATENT DOCUMENTS

| 3235396 | 3/1984 | Fed. Rep. of Germany . |
| 5862343 | 10/1981 | Japan . |
| 0062941 | 4/1982 | Japan | 123/325 |
| 60-179566 | 2/1984 | Japan . |
| 60-368 | 4/1985 | Japan | 192/3.28 |

Primary Examiner—Rodney H. Bonck
Attorney, Agent, or Firm—Lyon & Lyon

[57] ABSTRACT

A fuel supply control method for an engine having a fluid torque converter with a clutch for mechanically connecting the input and output sides of the fluid torque converter wherein the clutch is engaged and the fuel supply to the engine is stopped during speed reduction when the engine speed or the vehicular speed is over a predetermined value under a no load condition of the engine, such as during deceleration from a high speed. In the present method the clutch is released first at a predetermined speed and then the fuel supply to the engine is restarted when the speed, either engine speed or vehicular speed, drops below the first predetermined speed.

13 Claims, 2 Drawing Sheets

FUEL SUPPLY CONTROL METHOD FOR AN ENGINE WITH A FLUID TORQUE CONVERTER CLUTCH

This is a continuation of co-pending application Ser. No. 039,009 filed on Apr. 15, 1987 and now abandoned.

The present invention relates to a fuel supply control method for an engine of a vehicle having a fluid torque converter with a clutch for directly coupling the input and output sides of the torque converter under certain operating conditions and, in particular, a method of improving operation during deceleration of the vehicle.

There are well known advantages to providing a conventional fluid torque converter with a clutch for mechanically connecting the input and output sides thereof in which the clutch is engaged not only for cruising speeds but also at the time of speed reduction when the accelerator pedal is released so as to improve effectiveness of the engine braking. For engine braking the slip of the fluid torque converter is suppressed by means of the clutch engagement and a counter-driving torque is transmitted from the driving wheel or wheels to the engine, causing the engine speed to be kept relatively high compared to when the clutch is not applied. A device for economizing fuel by stopping the fuel supply to the engine until the engine speed drops below a predetermined value is also known through Japanese patent application early opening (Kokai) No. 60-1464 (1985).

In the above-said device, fuel supply is restarted in order to prevent engine stall when the engine speed falls below a predetermined value during continued speed reduction but the change of torque caused by the return to engine combustion due to such fuel restarting may be transmitted to the driving wheel side through the clutch and thereby produce a return shock which shock is not generated by accelerator pedal operation, whereby it is apt to create an uncomfortable feeling for the driver.

An object of the present invention is to provide a control method for preventing generation of the return shock during speed reduction as described above. In order to achieve this purpose, a method according to the present invention, in which a clutch is used to mechanically connect the input and output sides of a fluid torque converter connected with an engine, and in which the clutch is operated and the fuel supply to the engine is stopped at the same time during speed reduction when the engine speed or the vehicular speed is over a predetermined value under no load condition, is characterized in that the clutch is released first and then the fuel supply to the engine is restarted when the engine speed or the vehicular speed drops below the predetermined value. Since the clutch has been released before the fuel supply to the engine is restarted when the engine speed or vehicle speed is dropping during speed reduction, the change of the torque of the engine caused by the restart of the fuel supply is absorbed by means of the slip of the fluid torque converter, thus generating no noticeable return shock.

The foregoing objects and advantages of the present invention will appear more fully from a consideration of the detailed description of a preferred embodiment as shown in the accompanying drawings wherein.

Figure 1:
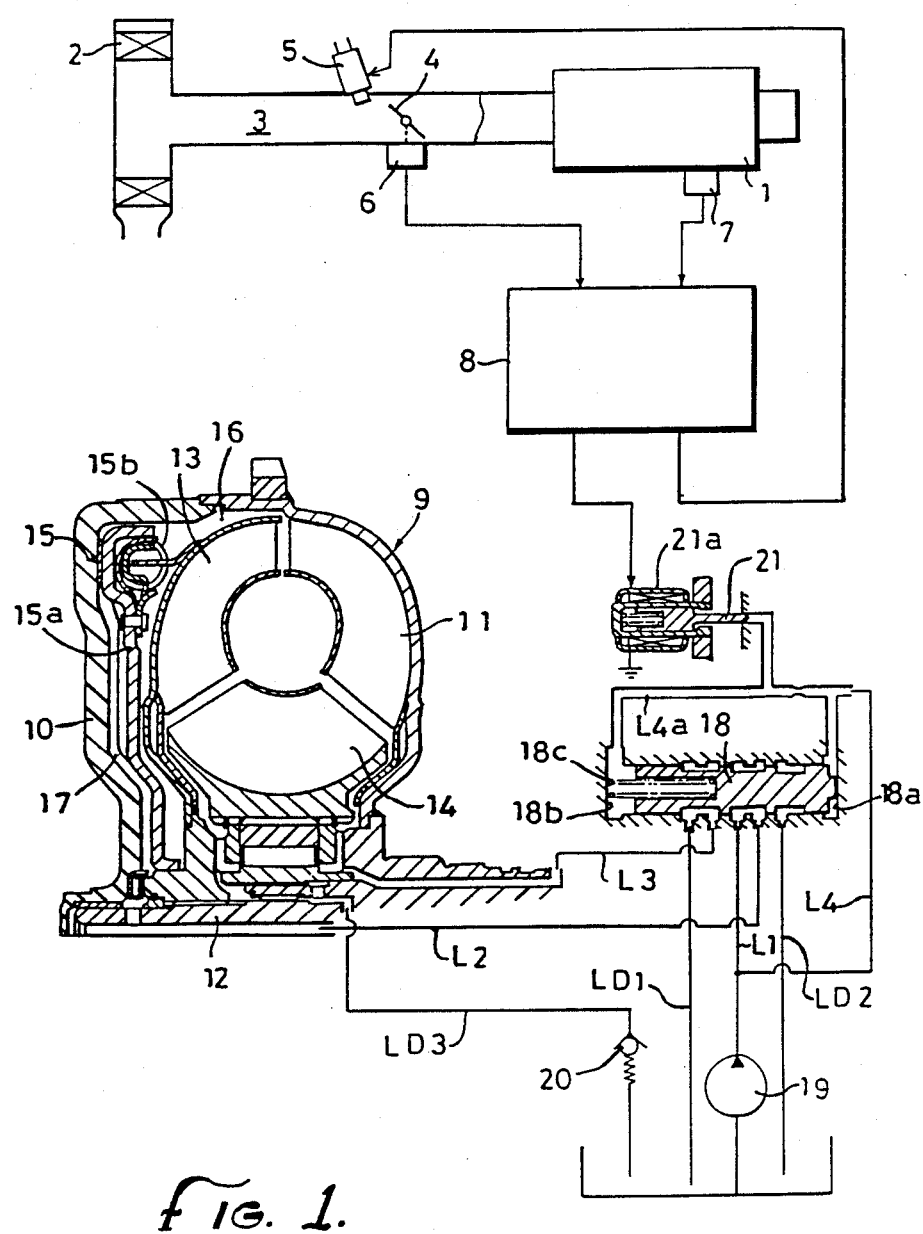
FIG. 1 is a diagrammatic illustration of a system employing the present invention.

Referring now to FIG. 1, there are shown an engine 1, an air cleaner 2 and a suction line 3. A fuel injection valve 5 is provided on the upstream side of a throttle valve 4 in the suction line 3. Signals from a throttle opening sensor 6 which detects the opening θ of the throttle valve 4 and an engine speed sensor 7 which detects the speed Ne of the engine 1 are input to an electronic control unit 8. The valve opening time of injection valve 5 is variably controlled by unit 8 corresponding to the throttle opening θ and the engine speed Ne, so that the required quantity of fuel is supplied by injection to the respective cylinders of the engine 1. The output torque of the engine is transmitted to the driving wheel or wheels of the vehicle through a fluid torque converter 9 and an auxiliary transmission (not shown).

Figure 2:
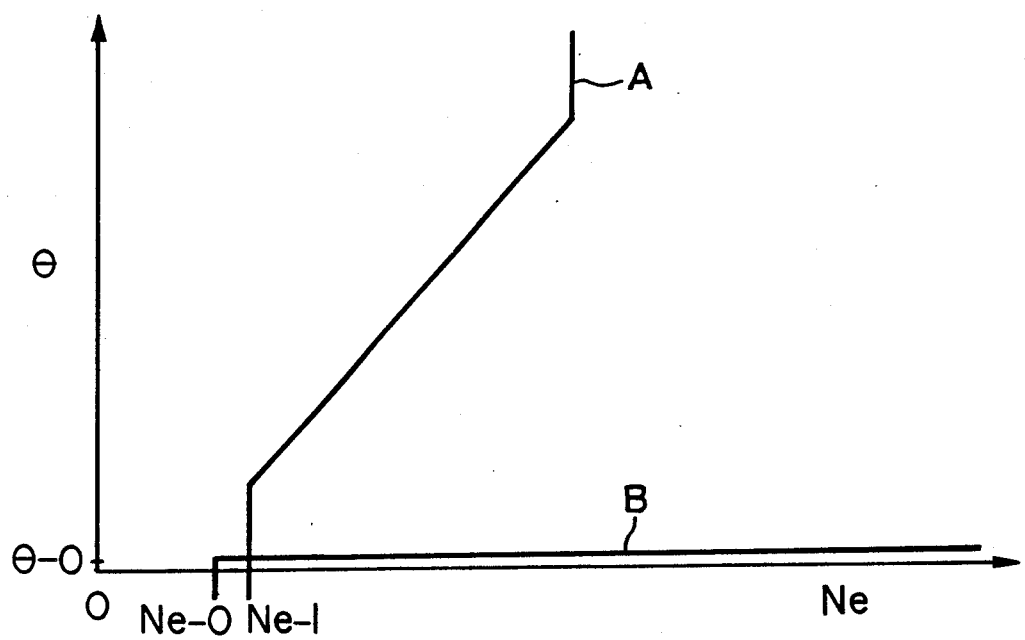
FIG. 2 is a graph of the control characteristics of the method of the present invention.

The fluid torque converter 9 is provided, in an internal space which is defined on one side by an input case 10 connected to the crankshaft of the engine 1 and on the other side by a pump 11 connected to the input case 10, with both a turbine 13 connected to a driving shaft 12 of the auxiliary transmission and a stator 14 interposed between the pump 11 and the turbine 13. The fluid torque converter 9 is also provided with a clutch 15 which is operable for mechanically connecting and disconnecting the input case 10 on the input side of the torque converter 9 and, the turbine 13 on the output side. The clutch 15 is constructed so that the fluid torque transmission due to internal circulation of fluid among the impellers of pump 11, turbine 13, and stator 14 is accomplished when the clutch 15 is released and the mechanical torque transmission is accomplished through the clutch 15 when the clutch 15 is engaged. Various types of clutches, such as a multi-disc type friction clutch, may be used for the clutch 15. A single disc type friction clutch is shown in the drawings which has its clutch disc 15a made movable in the axial direction between the input case 10 and the turbine 13 and the clutch disc 15a is connected to the turbine 13 through a damper spring 15b. The internal space of the torque converter 9 is partitioned by said clutch disc 15a into an impeller housing chamber 16 on one side and a back pressure chamber 17 on the other side, between the input case 10 and the clutch disc 15a. Connection and disconnection of the clutch 15 are controlled and performed by a control valve 18. The control valve 18 may be selectively switched between (1) the clutch released position on the righthand side (as shown in the drawing) in which a first oil line L1 for the oil supply leading to an oil pressure source 19 is connected to a second oil line L2 leading to a back pressure chamber 17 thereby to supply the oil to the back pressure chamber 17 and in which a third oil line L3 leading to the impeller housing chamber 16 is connected to a first oil drain line LD1 thereby to drain the oil from the housing chamber 16, and (2) the clutch applied position on the lefthand side in which the first line L1 is connected to the third oil line L3 thereby to supply the oil to the housing chamber 16 and in which the second oil line L2 is connected to a second oil drain line LD2 thereby to drain the oil from the back pressure chamber 17. In the clutch applied position, the internal pressure of the housing 16 is held comparatively high by means of a check valve 20 disposed in a third oil drain line LD3 connected thereto and the clutch disc 15a is pressed against the input case 10 by the internal pressure, whereby mechanical torque transmission is accomplished through such operation of the clutch 15. A fourth oil line L4 branched from the first oil line L1 is connected to an oil chamber 18a at the righthand end of the control valve 18. An oil line L4a, provided with an orifice, leads from the fourth oil line L4 to an oil chamber 18b at the lefthand end of valve 18. An electromagnetic oil drain valve 21 is also connected to the oil line L4a between the orifice and chamber 18b. Thus, when the oil drain valve 21 is opened, the control valve 18 is moved leftwards against a spring 18c by the pressure difference between both oil chambers 18a and 18b and is switched over to the clutch operating position. The power to a solenoid 21a of the oil drain valve 21 is controlled by electronic control unit 8 and the valve 21 is opened in the area on the higher speed of rotation side of the line A shown in FIG. 2 to thereby operate the clutch 15 as described above. The clutch 15 is kept in the engaged or operated position until the engine speed Ne drops to a predetermined value Ne-1 (for example, 1,100 r.p.m.) under a no load condition of the engine, i.e. in the area of throttle opening below the line B in FIG. 2 where the throttle opening θ is below the predetermined reference opening θ-0 so that the engine brake performance may be improved at the time of speed reduction, and furthermore, the fuel injection from the fuel injection valve 5, i.e. the fuel supply to the engine 1 is stopped during the clutch engagement in such low throttle opening area so that the fuel economizing effect may be obtained. If the fuel supply is restarted simultaneously with the release of the clutch 15 due to lowering of the engine speed Ne to the predetermined value Ne-1, the change in torque caused by the return of fuel combustion in the engine 1 is generated before the engagement force of the clutch 15 is lowered sufficiently, which will be transmitted to the driving wheels side of the fluid torque converter through the clutch 15. Therefore, in the embodiment shown in FIG. 2 of the drawings, the engine speed Ne-0 for the restarting of the fuel supply is set lower (for example, 1,000 r.p.m.) than predetermined value Ne-1 so that the clutch 15 is released first and then the fuel supply is restarted when the engine speed Ne becomes lower than predetermined value Ne-1.

According to such an arrangement, the engagement force of the clutch 15 is lowered sufficiently as of the restarting time of the fuel supply so that the change in torque caused by the return to fuel combustion is absorbed by the slip of the fluid torque converter 9 and no return shock is generated. As an alternative control, a delay timer means may be provided which is operated when the engine speed Ne is lowered to the predetermined value Ne-1 to restart the fuel supply with a certain time delay after the release of the clutch 15.

While a fuel injection type engine has been described, the present invention is also applicable in a similar manner as described above to a carburetor type engine by disposing a selectively operable shut-off valve in the fuel line of the carburetor. It is also possible to use the vehicular speed as the control parameter instead of the engine speed. Also the system may be constructed so as to detect the no load condition of the engine 1 by the suction negative pressure, such as may be detected by an intake suction pressure sensor 6a, on the downstream side of the throttle valve 4 in place of detecting the throttle opening.

According to the present invention, the operation of a fluid torque converter clutch is released preceding the restart of the fuel supply during deceleration of the vehicle and the change in torque caused by the return to fuel combustion in the engine is absorbed by the slip of the fluid torque converter, thus preventing generation of a return shock.

The invention claimed is:

1. A fuel supply control method for an engine with a fluid torque converter in which a clutch is used to mechanically connect the input and output sides of the fluid torque converter wherein the clutch is engaged and the fuel supply to said engine is stopped during speed reduction when the speed, consisting of one of the engine speed and the vehicular speed, is over a predetermined value, characterized in that during speed reduction when the speed is below the predetermined value, releasing said clutch first and then restarting the fuel supply to said engine and absorbing at least some of any return shock in the fluid torque converter, wherein said clutch is released at a first predetermined engine speed, and said fuel supply restaring occurs at a second lower predetermined engine speed.

2. A fuel supply control method for an engine with a fluid torque converter in which a clutch is used to mechanically connect the input and output sides of the fluid torque converter wherein the clutch is engaged and the fuel supply to said engine is stopped during speed reduction when the speed, consisting of one of the engine speed and the vehicular speed, is over a predetermined value, characterized in that during speed reduction when the speed is below the predetermined value, releasing said clutch first and then restarting the fuel supply to said engine and absorbing at least some of any return shock in the fluid torque converter, wherein said clutch is released at a first predetermined vehicular speed and said fuel supply restarting occurs at a second lower predetermined vehicular speed.

3. A fuel supply control method for an engine with a fluid torque converter in which a clutch is used to mechanically connect the input and output sides of the fluid torque converter wherein the clutch is engaged and the fuel supply to said engine is stopped during speed reduction when the speed, consisting of one of the engine speed and the vehicular speed, is over a predetermined value, characterized in that during speed reduction when the speed is below the predetermined value, releasing said clutch first and then restarting the fuel supply to said engine and absorbing at least some of any return shock in the fluid torque converter, wherein said clutch is released first and then the fuel supply restarting sequence only occurs upon detecting a substantially no load condition of the engine.

4. The control method of claim 3 wherein said substantially no load condition is detected by the degree of opening of a throttle valve for the engine.

5. The control method of claim 3 wherein said substantially no load condition is detected by intake suction pressure on the engine.

6. A fuel supply control method for an engine with a fluid torque converter in which a clutch is used to mechanically connect input and output sides of the fluid torque converter comprising the steps of:

sensing the engine speed;

during speed reduction: (a) engaging the clutch at about the same time as stopping the fuel supply to the engine when the engine speed is over a predetermined value and (b) releasing the clutch before restarting the fuel supply when the engine speed is below the predetermined value;

detecting the load condition of the engine; and restarting the fuel supply only after a substantially no load condition of the engine is detected.

7. The control method of claim 6 wherein the step of detecting load condition comprises detecting the degree of opening of a throttle valve for the engine.

8. The control method of claim 6 wherein the step of detecting load condition comprises detecting intake suction pressure of the engine.

9. A fuel supply control method for an engine with a fluid torque converter in which a clutch is used to mechanically connect input and output sides of the fluid torque converter comprising the steps of:

sensing the vehicular speed;

during speed reduction: (a) engaging the clutch at about the same time as stopping the fuel supply to the engine when the vehicular speed is over a predetermined value and (b) releasing the clutch before restarting the fuel supply when the vehicular speed is below the predetermined value;

detecting the load condition of the engine; and restarting the fuel supply only after a substantially no load condition of the engine is detected.

10. The control method of claim 9 wherein the step of detecting load condition comprises detecting the degree of opening of a throttle valve for the engine.

11. The control method of claim 9 wherein the step of detecting load condition comprises detecting intake suction pressure of the engine.

12. A method of preventing generation of return shock during speed reduction in an engine with a fluid torque converter in which a clutch is used to mechanically connect input and output sides of the fluid torque converter comprising the steps of:

sensing a speed consisting of one of the engine speed and the vehicular speed; and during speed reduction: (a) engaging the clutch at about the same time as stopping the fuel supply to the engine when the speed is over a first predetermined value, (b) releasing the clutch when the speed goes below the first predetermined value, (c) restarting the fuel supply when the speed reaches a second predetermined value, the second predetermined value being lower than the first predetermined value, and (d) absorbing at least some of any return shock in the fluid torque converter.

13. A method of preventing generation of return shock during speed reduction in an engine with a fluid torque converter in which a clutch is used to mechanically connect input and output sides of the fluid torque converter comprising the steps of:

sensing a speed consisting of one of the engine speed and the vehicular speed; and during speed reduction: (a) engaging the clutch at about the same time as stopping the fuel supply to the engine when the speed is over a first predetermined value, (b) releasing the clutch when the speed goes below the first predetermined value, (c) upon a predetermined time delay after the release of the clutch, restarting the fuel supply, and (d) absorbing at least some of any return shock in the fluid torque converter.

* * * * *